US009619125B2

United States Patent
Ruszala

(10) Patent No.: US 9,619,125 B2
(45) Date of Patent: Apr. 11, 2017

(54) SYSTEMS AND METHODS FOR ADDRESSABLY PROGRAMMING A NOTIFICATION SAFETY DEVICE

(71) Applicant: SIEMENS INDUSTRY, INC., Alpharetta, GA (US)

(72) Inventor: Dariusz Ruszala, Fairfield, NJ (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 158 days.

(21) Appl. No.: 14/552,038

(22) Filed: Nov. 24, 2014

(65) Prior Publication Data

US 2016/0148498 A1    May 26, 2016

(51) Int. Cl.
   *G08B 29/00*    (2006.01)
   *G06F 3/0484*   (2013.01)
   *G08B 25/00*    (2006.01)

(52) U.S. Cl.
   CPC ....... *G06F 3/04842* (2013.01); *G08B 25/003* (2013.01)

(58) Field of Classification Search
   CPC ...... G08B 29/18; G08B 25/003; G08B 25/10; G08B 25/14; G08B 25/008; G08B 25/007; G08B 25/001; G08B 23/00; G08B 29/145; G08B 13/19684; G06F 3/04817; G06F 3/0482; G06F 3/04842
   USPC ....... 340/286.05, 506, 514, 508, 517, 10.41, 340/539.2, 3.1, 521
   See application file for complete search history.

(56) References Cited

U.S. PATENT DOCUMENTS

| 6,693,529 | B2* | 2/2004 | Suzuki ............... G08B 25/003 340/3.1 |
| 7,222,256 | B2 | 5/2007 | Pickell |
| 7,429,921 | B2* | 9/2008 | Seeley ............... G08B 25/14 340/3.1 |
| 7,469,204 | B2* | 12/2008 | Brooks ............. G01R 31/2827 340/506 |
| 7,649,450 | B2* | 1/2010 | Campion, Jr. ....... G08B 29/123 340/506 |
| 8,155,767 | B2 | 4/2012 | Elmankabady et al. |
| 8,164,440 | B2 | 4/2012 | Lontka |
| 8,644,792 | B2 | 2/2014 | Lontka |
| 2003/0048304 | A1 | 3/2003 | Lontka et al. |
| 2006/0074494 | A1 | 4/2006 | McFarland |

(Continued)

FOREIGN PATENT DOCUMENTS

WO    2008027964 A2    3/2008

*Primary Examiner* — Anh V La

(57) ABSTRACT

Systems, methods, and devices for addressably programming notification devices are provided. The system includes at least a notification device connected to a mobile communication device via a communication link. The mobile communication device includes a wireless transceiver configured to establish communication with the notification device, and a configuration list that includes location information associated with the notification device and an address associated with a network connecting the notification device to a control panel. The mobile communication device also includes a memory that stores the configuration list, and a processor in signal communication with the memory and that executes a plurality of instructions that, upon execution, accesses the configuration list and assigns an address to the notification device.

24 Claims, 7 Drawing Sheets

(56) References Cited

U.S. PATENT DOCUMENTS

2007/0241866 A1 10/2007 Cool et al.
2012/0154160 A1 6/2012 Piccolo, III
2014/0292535 A1 10/2014 Petite et al.

* cited by examiner

SYSTEMS AND METHODS FOR ADDRESSABLY PROGRAMMING A NOTIFICATION SAFETY DEVICE

TECHNICAL FIELD

The present disclosure relates generally to networked devices and systems, and more particularly, to networked notification safety devices and systems for use within and in cooperation with building automation systems.

BACKGROUND

Typical notification safety systems include a number of devices, e.g., in a fire safety system, the devices may include fire or smoke detectors, pull stations, notification appliances etc., positioned throughout an infrastructure/building. These notification devices are generally monitored by a controller such as, for example, a fire alarm control panel (FACP), which includes information related to device status, location, and other information related to the respective devices. Prior to being installed at the desired locations, the notification devices are normally addressed (i.e., programmed) at the FACP or via a Device Programming Unit (DPU), which is typically at a different location from where the device will be installed. The programming step normally includes plugging the notification devices into an input/output port of the FACP, and subsequently transmitting an address to the notification device necessary for identifying the notification device to the FACP. Multiple devices are typically programmed during this step, thus allowing for installer to install the required devices at the desired location (device site) without needing to return to the FACP. Thereafter, technicians receive a layout of where the notification devices are to be installed, and begin installing the same. Unfortunately, this installation step is seldom completed without error. Because the notification devices are addressed for specific locations prior to actual installation, technicians are prone to install a device in a location that differs from the location identified (mapped) in the FACP. This could occur by simply grabbing and installing the wrong notification device in an area not designated for that notification device. Such errors may lead first response units to an incorrect location in emergency situation.

Therefore, there remains a need to more efficiently program notification safety devices, thereby reducing addressable errors that may occur during the installation process.

SUMMARY

In one embodiment, an apparatus for addressably programming a notification device is described. The apparatus includes a wireless transceiver operably configured to selectively establish communication with the notification device. The apparatus further includes a configuration list that includes location information associated with the notification device, and an address associated with a network connecting the notification device to a control panel. The apparatus also includes a memory that stores the configuration list and a plurality of instructions that, when executed, accesses the configuration list to identify the address based on the location information, and assigns the identified address to the notification device via the wireless transceiver; Additionally, the apparatus includes a processor in signal communication with the memory and that executes the plurality of instructions.

In another embodiment, a method for programming one of a plurality of notification devices with an address for communicating with a control panel across a network is described. The method includes the step of establishing, via a portable apparatus, wireless communication with the one of the plurality of notification devices. The method further includes the step of accessing, via the portable apparatus, a configuration list that includes the address and location information associated with the one notification device. The method also includes the step of identifying the address in the configuration list based on the location information; and transmitting the identified address to the one notification device.

In yet a further embodiment, a non-transitory computer-readable medium storing therein an addressable program that causes an apparatus for addressably programming a notification device to execute an operation is described. The operation includes the step of establishing, via a portable apparatus, wireless communication with the one of the plurality of notification devices. The operation further includes the step of accessing, via the portable apparatus, a configuration list that includes the address and location information associated with the one notification device. The operation also includes the step of identifying the address in the configuration list based on the location information and transmitting the identified address to the one notification device.

In another embodiment, a networked safety system is described. The networked safety system includes a notification device operably connected to a mobile communication device proximate to the notification device via a communication link. The mobile communication device includes a wireless transceiver operably configured to selectively establish communication with the notification device. The mobile communication device further includes a configuration list that includes location information associated with the notification device and an address associated with a network connecting the notification device to a control panel. The mobile communication device also includes a memory that stores the configuration list and a plurality of instructions that, when executed, accesses the configuration list to identify the address based on the location information, and assigns the identified address to the notification device via the wireless transceiver. Additionally, the mobile communication device includes a processor in signal communication with the memory and that executes the plurality of instructions.

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present invention.

In general, the computing systems and devices described herein may be assembled by a number of computing components and circuitry such as, for example, one or more processors (e.g., Intel®, AMD®, Samsung®) in communication with memory or other storage medium. The memory may be Random Access Memory (RAM), flashable or non-flashable Read Only Memory (ROM), hard disk drives, flash drives, or any other types of memory known to persons of ordinary skill in the art and having storing capabilities. The computing systems and devices may also utilize cloud computing technologies to facilitate several functions, e.g., storage capabilities, executing program instruction, etc. The computing systems and devices may further include one or more communication components such as, for example, one or more network interface cards (NIC) or circuitry having analogous functionality, one or more one way or multi-directional ports (e.g., bi-directional auxiliary port, universal serial bus (USB) port, etc.), in addition to other hardware and software necessary to implement wired communication with other devices. The communication components may further include wireless transmitters, a receiver (or an integrated transceiver) that may be coupled to broadcasting hardware of the sorts to implement wireless communication within the system, for example, an infrared transceiver, Bluetooth transceiver, or any other wireless communication know to persons of ordinary skill in the art and useful for facilitating the transfer of information. Additionally, a power supply/pack (e.g., hard wired, battery, etc.) may be included in any of the computing devices described herein. These power supplies may also include some form of redundancy or a backup power means known to persons of ordinary skill and for maintaining the functionality of the computing devices and/or components described herein.

Figure 1:
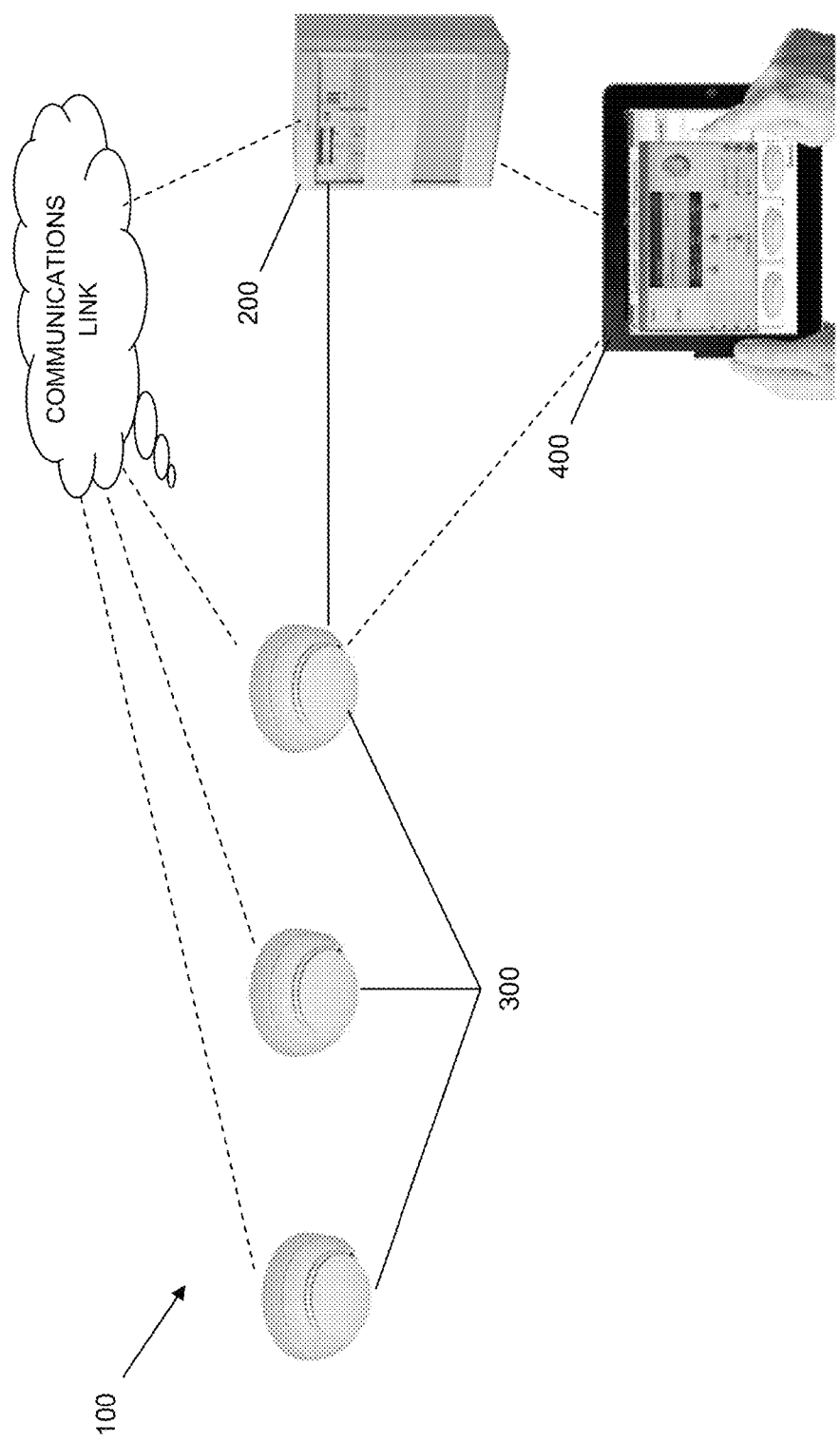
FIG. 1 illustrates an embodiment of a system for addressably programming a notification safety device in accordance with the disclosure provided herein.

Referring now to the drawings wherein the showings are for purposes of illustrating embodiments of the subject matter herein only and not for limiting the same, FIG. 1 illustrates an embodiment of a system for addressably programming a notification safety device. As shown in FIG. 1, the system 100 may include a safety system control panel 200, one or more notification devices 300 (also referred to herein as a notification safety device), and a mobile device 400. The control panel 200, notification safety device 300, and mobile device 400 may be operably connected to each other via a direct communications link, remote communications link, or any communication link known to persons of ordinary skill in the art and configurable to allow for communication and/or interfacing between the devices and/or components of the system 100. Examples of such communication links may include Local Area Networks (LAN), Wide Area Networks (WAN), and Global Area Networks (GAN) having wire or wireless branches. Additionally, network devices/components and/or nodes (e.g., cabling, routers, switches, gateway, etc.) may also be included in the system 100 for facilitating the transfer of information within the system 100, and between at least the control panel 200, the one or more notification safety devices 300, and the mobile device 400.

Figure 2:
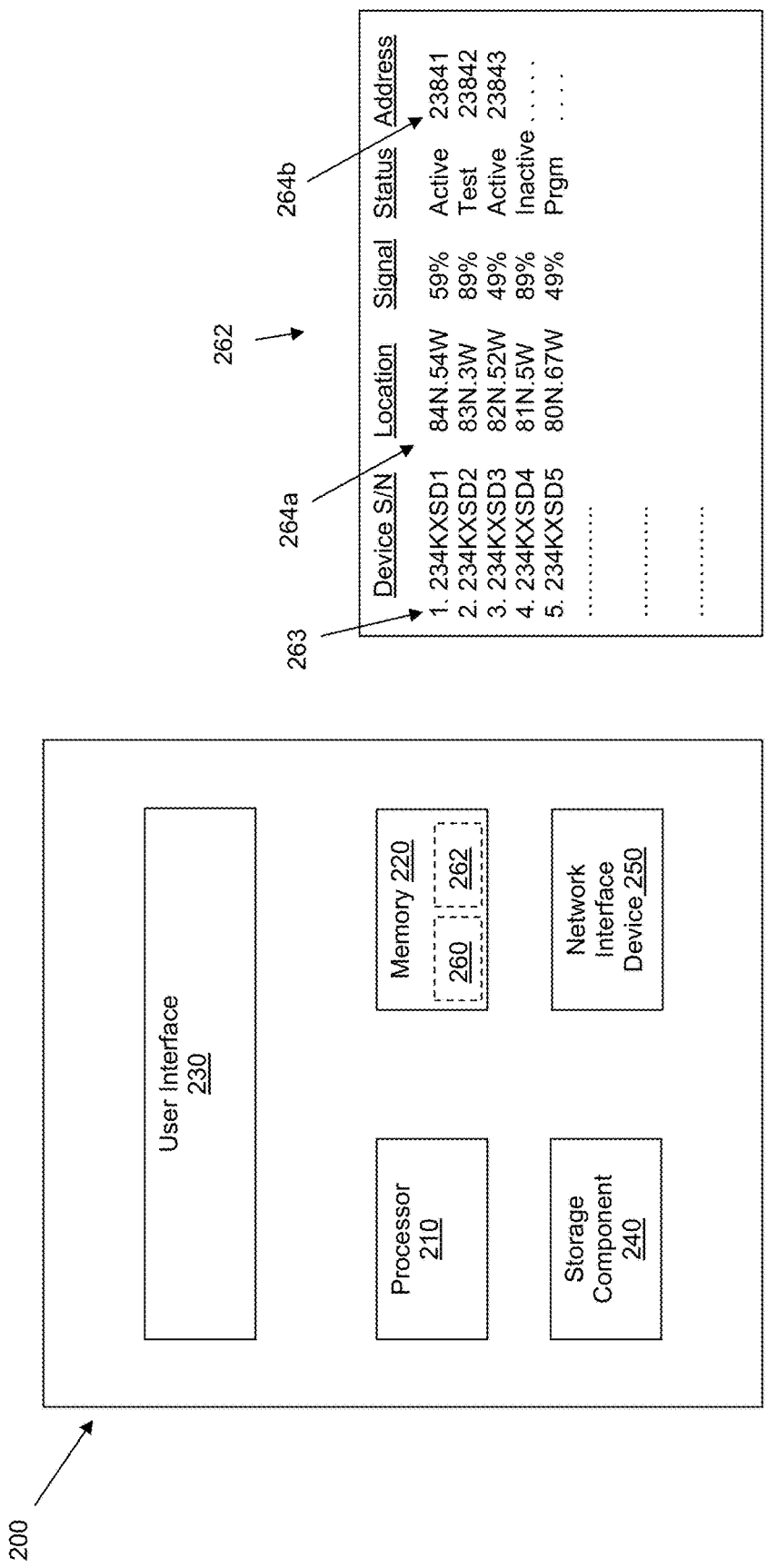
FIG. 2A illustrates an embodiment of a safety system control panel that may be utilized in the system shown in FIG. 1.
FIG. 2B illustrates an embodiment of a configuration list having location information that may be utilized in the system shown in FIG. 1.

With continued reference to the figures, FIG. 2 illustrates an embodiment of the safety system control panel 200, which may be utilized in the system shown in FIG. 1. As of FIG. 2, the control panel 200 may include any combination of the components and/or circuitry described above for facilitating the transfer of information within the system 100. In the embodiment shown in FIG. 2, the control panel 200 includes, at least a processor 210, a memory 220, a user interface 230, a storage component 240 and a network interface device 250. The user interface 230 may be any general interface (e.g., a graphical interface (GUI)), that receives user input and generates an output, e.g., a displayable output. The various commands executed by the control panel 200 may be activated upon selection of the commands via the user interface 230. The network interface device 250 may be configured for dual function connectivity to facilitate the exchange of information between the devices and/or components within the system 100. In the embodiments described herein, for example, the control panel 200 may be a fire alarm control panel (FACP). The FACP 200 may send and receive multiple commands to and from the devices within the system 100. For example, the FACP 200 may send commands to update the status of a notification safety device 300 into a variety of modes. For example, the FACP may instruct the notification safety device 300 to activate a programming mode for receiving location/addressable information from the FACP 200 or other devices, as will be described further herein. Additionally, the FACP 200 may request status information from the notification safety device 300 to determine whether the notification safety device 300 is on or offline. Any number of commands may be submitted by the FACP 200 known to persons of ordinary skill in the art and for purposes of maintaining the functionality of the FACP/control panel 200.

In a further embodiment, the control panel 200 may include a means for generating an address, e.g., an address generator 260 (described in further detail below), or a configuration list 262 including records 263 (e.g., 1-5 of FIG. 2b) having location information 264a related to one or more notification safety devices 300. Each record 263 of the configuration list 262 may further include one or more available addresses 264b associated with the location information 264a identified in the record for subsequent assignment to the notification safety devices 300 disposed at or in proximity to such location information 264b. Each record 263 of the configuration list 262 may also include information for maintaining the functionality of the notification safety devices 300 and/or other devices within the system 100. In one embodiment, the control panel 200 may provide the configuration list 262 to the mobile device 400 for facilitating the assignment of the location information 264a to the notification safety device 300. When the control panel 200 provides the configuration list 262, the control panel 200 may also be set to a programming mode. This mode may be set prior to transmitting the configuration list 262 to the mobile device 400. Additionally, the control panel 200 may submit signals/commands to activate the programming mode of one or more of the notification safety devices 300 to be programmed. The control panel 200 may also monitor the notification safety device 300 to determine whether the notification safety device 300 is in the programming mode, and ready to receive any configuration information (e.g., address) via the mobile device 400. As will be discussed herein, and upon confirmation that the notification safety device 300 is in the programming mode, the control panel 200 may determine whether the location information 264a submitted to the notification safety device 300 was successfully received by the notification safety device 300. This confirmation may be communicated to the control panel 200 via the mobile device 400, or directly from the notification safety device 300. After confirming that the configuration information was successfully programmed into the notification safety device 300, the control panel 200 may change the state of the notification safety device 300 and/or the control panel 200 from the programming mode to its normal operation state (e.g., active mode).

The control panel 200 may further facilitate the monitoring of the alarm conditions sensed by the notification safety device 300, and the transmitting of information related to the alarm condition to, for example, emergency response personnel. Additionally, the control panel 200 may activate various visual and audible indicators on the notification safety device 300, based on the sensed alarm condition. It should be appreciated that the control panel 200 may perform at least the foregoing functions directly with the notification safety device 300 through the network interface device 250, and/or the mobile device 400. For example, the activation of the notification safety devices 300 into the programming mode may be completed via a direct communication link between the notification safety device 300 and the control panel 200, or via remote communication link via the various devices of the system 100.

In yet a further embodiment, a system software logic configuration tool (SSLC), e.g., Zeus® XLS Programming Tool, may be utilized for configuring the control panel 200 and/or other devices in the system 100. Similar to the functions of the control panel 200 regarding the programming of the notification safety device 300, the SSLC may be used for providing the configuration information having location information to the control panel 200, the mobile device 400, or notification safety device via the control panel 200 and/or mobile device 400. The SSLC may operate separately from the control panel 200, i.e., using hardware component separate from the control panel 200, or execute programming instructions using the hardware components of the control panel 200.

Figure 3:
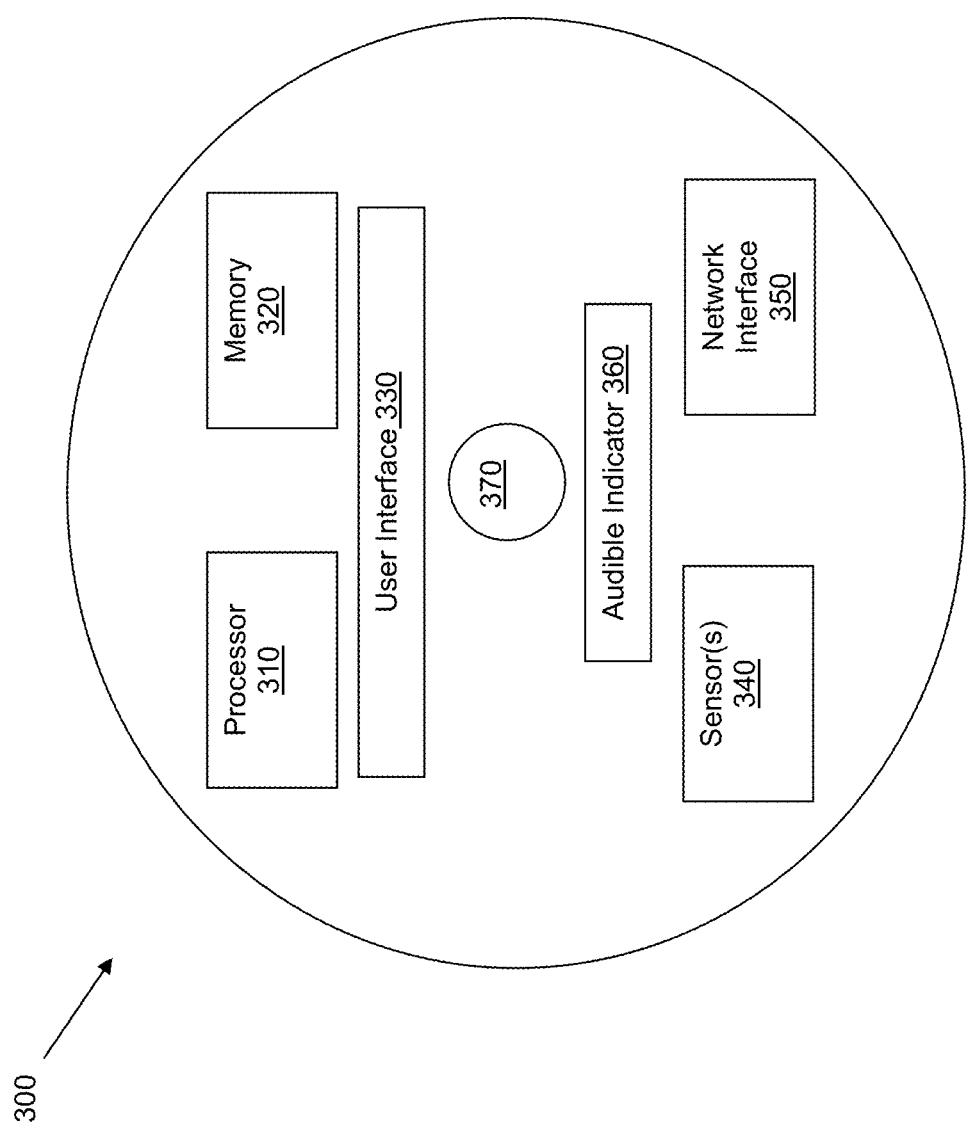
FIG. 3 illustrates an embodiment of a notification safety device that may be utilized in the system shown in FIG. 1.

With continued reference to the figures, and now FIG. 3, an embodiment of a notification safety device 300 that may be utilized in the system of FIG. 1 is shown. The notification safety device 300 may be configured to interface with the control panel 200 and/or the mobile device 400, from which control and/or monitoring of the notification safety devices 300 may be performed. Additionally, as previously described, intervening devices and or components (e.g., routers, switches etc.) may be used to facilitate the transmission of information between the notification safety device 300, control panel 200, and the mobile device 400. The notification safety device 300 may be any number of devices, such as detectors (e.g., smoke), sensors, controllers (e.g., I/O devices, relays), pull stations, etc., to detect and control safety related concerns. Similar to the control panel 200, the notification safety device 300 may include any combination of the above circuitry and components to facilitate communication within the system 100, and for its operational purposes.

In the embodiment of FIG. 3, the notification safety device 300 may include at least one or more processors 310, memory components 320, user interface 330, sensors 340, and network interface components 350. The user interface 330 may be similar to the user interface 230 of the control panel 200 in that it may provide a means for transmitting commands to and from the devices within the system 100, for example, commands to and from the control panel 200 or the mobile device 400. In embodiments where the user interface is a GUI, a display (not shown) or the like may be included to facilitating the execution of commands. Examples of the types of commands include, but are not limited to, commands relating to diagnostics, status or other non-alarm type events. These commands may be received from the control panel 200 and/or the mobile device 400. Additionally, the commands may be submitted at random or in a predetermined manner from the notification safety device 300 to any of the system 100 devices to indicate status and/or other events related to the notification safety device 300.

With continued reference to the figures, the sensors 340 may be configured to facilitate the transmission of information to and from the control panel 200, the mobile device 400, or other devices within the system 100. The sensors 340 may be room temperature sensors, oxygen level sensors, air quality sensors, photoelectric sensors, ionization sensors, and thermal sensors for detecting conditions such as smoke, heat, or other fire related conditions indicative of a fire being present. Other means for sensing conditions known to persons of ordinary skill in the art, and having detection capabilities may also be chosen with sound judgment. Additionally, as shown in FIG. 3, one or more network interface components 350 for facilitating the transfer of information may be included in the notification safety device 300. In one embodiment, the network interface components 350, or means for interfacing, may include any number of components operable for wired (e.g., NIC, USB, etc.) or wireless (e.g., wireless transceiver, Infrared, Bluetooth, Wi-Fi, etc.) communication within the system 100, and between its devices, such as, the notification safety device 300, the control panel 200, and/or the mobile device 400.

The notification safety device 300 may further include one or more indicators or means for indicating conditions, events, or status of the notification safety device 300. For example, as shown FIG. 3, the indicators may be an audible indicator 360, and a visual indicator 370, each of which may alert persons within the area of the notification safety device 300 that a situation or alarm event is ongoing. The audible indicator 360 may include a speaker, horn, siren or any aural output known to persons of ordinary skill in the art. The visual indicator 370 may be a strobe light, light emitting diode (LED), or the like, or any visual component capable of providing a visual aide of an ongoing event and/or status of the notification safety device 300 known to persons of ordinary skill in the art. The audible indicator 360 may be used for dual purposes, i.e., to alert a person of an event/emergency occurring, or to alert an installer that the notification safety device 300 is in a particular mode e.g., programming mode. Additionally, the visual indicator 370 may also indicate the current status of the notification safety device 300. In a further embodiment, where the audible 360 and visual indicators 370 has dual functionality (i.e., as an event indicator and status indicator), when the notification safety device 300 enters a programming mode, the indicators may change or update to a specific color and/or tone (audible) to indicate that the notification safety device 300 is ready to receive and transmit programming information. In yet a further embodiment, multiple audible indicators 360 and visual indicators 370 may be integrated into the notification safety device 300, with each having its own functionality as described herein.

The notification safety device 300 may further be configured to include a multitude of modes, some of which may be indicative of the notification safety device 300 status. The multitude of modes may include an active mode (AM), inactive mode (IM), testing mode (TM), programming mode (PM), or other modes known to person of ordinary skill in the art for facilitating the functionality of the notification safety device 300. In one embodiment, while in the active mode, the sensors 340 of the notification safety device 300 may monitor the surrounding areas to detect the conditions for which the sensor 340 is configured to detect. Where the notification safety device 300 is set to inactive mode, the notification safety device 300 may be disabled, for example, for maintenance of the notification safety device 300. Maintenance may include, for example, replacing batteries or the power source, sensors, indicators or any other components that may require that the notification safety device 300 be inactive. In the programming mode, the notification safety device 300 may be configured to interface with the control panel 200 and/or the mobile device 400 for the unidirectional or bi-directional communication of information related to the notification safety device 300. Although bi-directional communication is common, unidirectional communication, for example, may be utilized in embodiments where the notification safety device 300 is configured to only receive data. In this case, confirmation that the notification safety device 300 has been properly programmed may be communicated via the audio 360 or video indicators 370.

In operation, for example, in an embodiment where the notification safety device 300 is a smoke detector device, the notification device may generate an alarm signal if smoke is detected. The signal travels via a communication link to the control panel 200, which, in turn, generates an alarm message and transmits the alarm message for a control station (e.g., fire station). The alarm message may include, among other things, at least the address of the notification safety device 300, the time when the notification safety device 300 was activated, or the type of conditions being detected by the notification safety device 300. The control panel 200 may then cause one or more of the notification devices 300 to activate their audible or visual indicators, thereby alerting others about the ongoing conditions. The control panel 200 causes such activations as a function of the control panel 200. In a further embodiment, the notification safety device 300 may independently activate its audible or visual indicators upon detection of specific conditions by the one or more sensors of the notification safety device 300.

Figure 4:
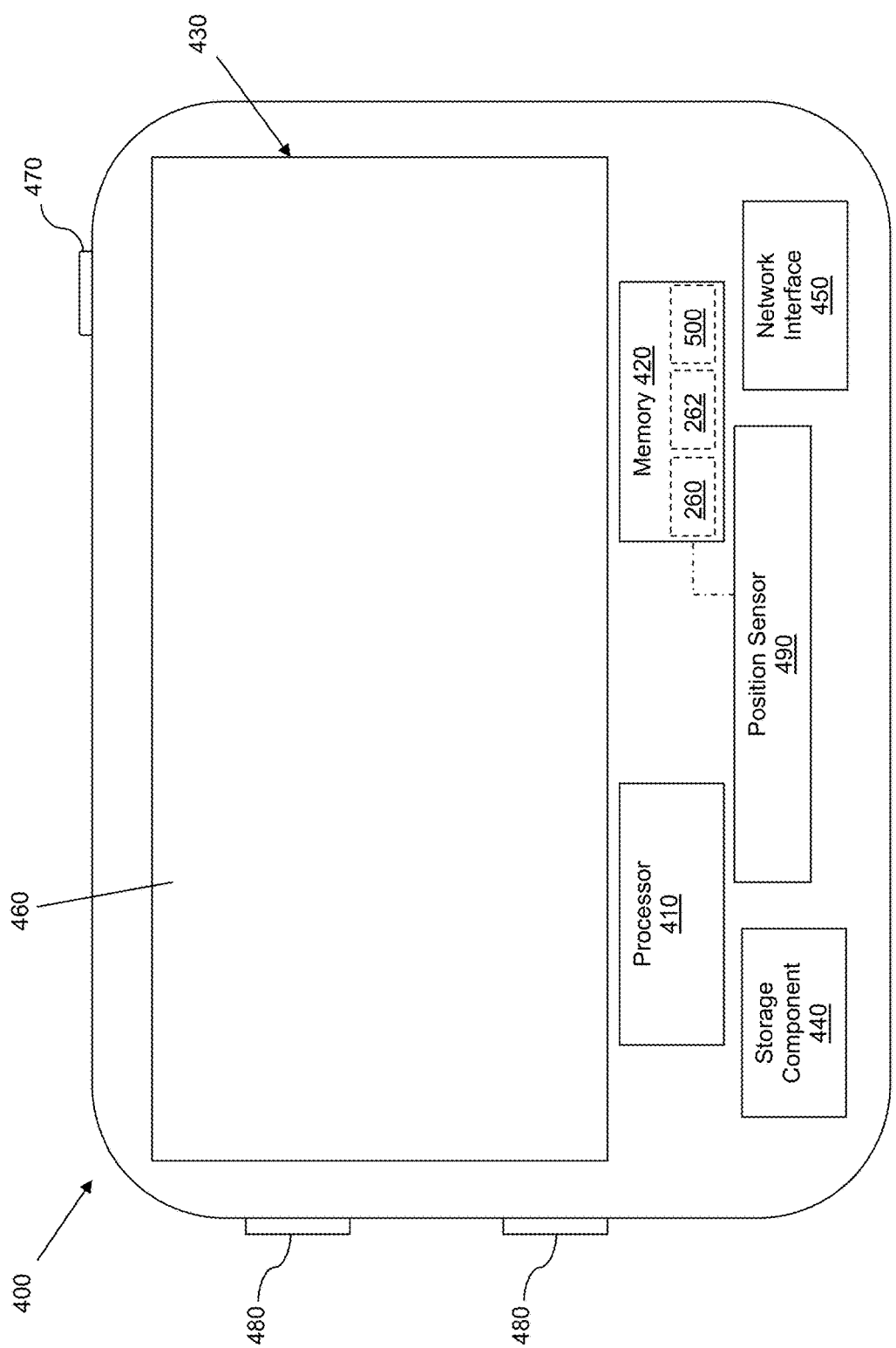
FIG. 4 illustrates an embodiment of a mobile device that may be utilized in the system shown in FIG. 1.

With continued reference to the figures, and now FIG. 4, an embodiment of a portable apparatus/mobile device 400 that may be utilized in the system of FIG. 1 is shown. The mobile device 400 may be a hand held device, for example, a personal digital assistant (PDA), smart phone, tablet, notebook, or any device known to persons of ordinary skill in the art and having the capability to be used remotely and with an installed notification safety device 300. The mobile device 400 may be configured to interface with the control panel 200 and/or the notification safety device 300 for facilitating the control and/or monitoring of the notification safety devices 300. Similar to the control panel 200 and notification safety device 300, the mobile device 400 may include any combination of the above circuitry and components to facilitate communication and the transmission of information within the system 100, and for its operational purposes. Additionally, the mobile device 400 may also include one or more operating systems such as, for example, Palm OS®, Microsoft® OS, Blackberry OS®, Symbian OS®, Mac OS®, I OS®, Linux OS® or any operating system known to persons of ordinary skill in the art and having the capabilities to execute programs for interfacing with the notification safety devices 300, control panel 200, or other devices/nodes communicating within the system 100.

In the embodiment of FIG. 4, the mobile device 400 includes, at least, a processor 410 in signal communication with a memory 420, a user interface 430, a storage component 440, and a network interface component 450. The processor 410 may be operable to execute a plurality of instructions of an addressing application 500 stored in the memory 420. Similar to the user interfaces for the control panel 200 and/or notification safety device 300, the user interface 430 may be any general interface for receiving user input and generating a displayable output on a display 460 of the user interface 430. The user interface 430 may be a touch screen display having dual functionality for providing an input means for receiving commands upon depressing the touch screen in any capacity, and a displaying means for displaying the results of the received/executed commands. Other input means that may be employed by the user interface 430 may include a keyboard, mouse, stylus or the like, connected to the mobile device 400 via the network interface component 450 (wired or wireless), or by other means known to persons of ordinary skill in the art and capable of interfacing an input device/component with the mobile device 400. The network interface component 450 may be similar to the network interface components of the notification safety device 300 in that it is operable to facilitate communication within the system 100. For example, the network interface component 450 may be a wireless transceiver, or any components operable for wired or wireless communication within the system 100, and between its devices.

Figure 6:
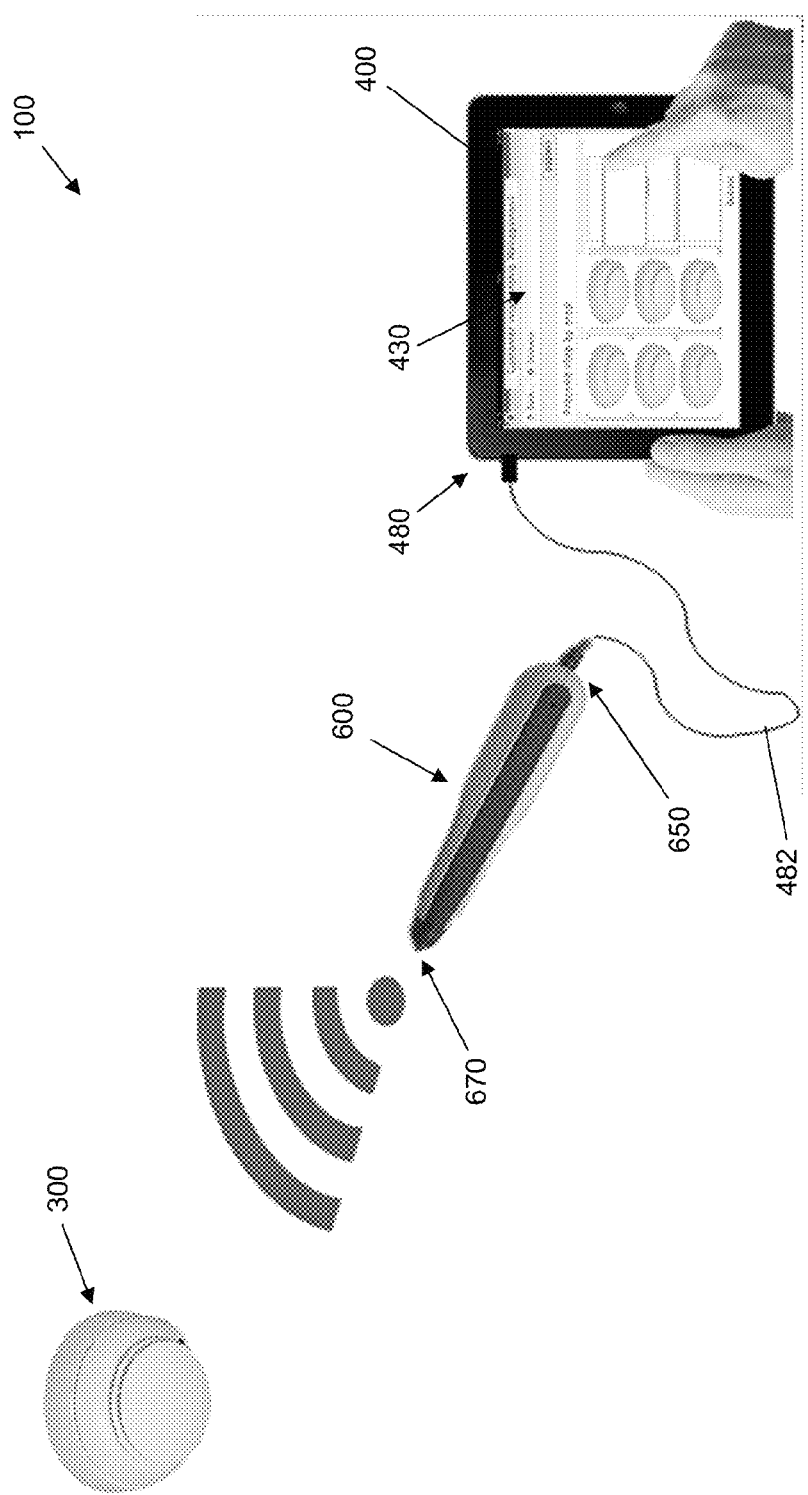
FIG. 6 illustrates a further embodiment of a system for addressably programming a notification safety device in accordance with the disclosure provided herein.

With continued reference to FIG. 4, the storage component 440 may be integrated into the mobile device (e.g., flash memory) or an external storage connected via the network interface component 450. Examples of external storages may be an external hard disc drive, cloud storage space, or other types of external storage devices known to persons of ordinary skill in the art and capable of being access in real-time by the mobile device 400. The mobile device 400 may further include one or more mobile sensors 470, and one or more mobile ports 480 (e.g., analog, digital, audio, auxiliary ports etc.) having input/output capabilities. The mobile sensors 470 may be configured to detect the status of the notification safety device 300, or to change the status of the notification safety device 300. For example, in an embodiment where the notification safety device 300 is already in programming state, the mobile sensor 470 may send a series of signals and/or requests to the notification safety device 300 to verify its current state, and that a communication link may be established to commence the programming of the notification safety device 300. If the request returns a message that the notification safety device 300 is not in a programming state, a series of instructions may be executed via the mobile device 400 to activate the programming state of the notification safety device 300. The mobile ports 480 may also have dual functionality, for sending and receiving information to any of the devices within the system 100. Additionally, the mobile port 480 may be used to provide a direct link between multiple mobile devices 400 (FIG. 6). Connections and the transmission of information via the mobile ports 480 may further be facilitated using cables 482 (FIG. 6) e.g., auxiliary cable, analog audio cable, USB cable or the like, for providing a wired interface between the devices.

In yet a further embodiment, the mobile device 400 may include a means for determining the position, or position sensor 490, such as a GPS device (e.g., a GPS receiver or Assisted GPS module), a navigation module or the like, or any transceiver or module known to persons of ordinary skill in the art for determining location coordinates. The addressing application 500 may include a series of instructions for communicating with the position sensor 490 to determine the current position of the mobile device 400, and providing the coordinates for use with the location information 264*a*. The addressing application 500 may then use the current position of the mobile device to confirm the location of the next notification safety device 300 to be assigned an address 264*b* by the mobile device 400. For example, during a walk-through by a technician carrying the mobile device 400, when the mobile device 400 is proximate to an installed notification safety device 300, the addressing application 500 (FIG. 5) may: prompt the position sensor 490 for the current position of the mobile device 460; compare the current position of the mobile device 460 to each location information 264*a* (e.g., longitudinal or latitudinal coordinates) in the configuration list 262 to identify the closest location information 264*a* to the current position of the mobile device 460 and corresponding to the proximate notification safety device 300; identify the record 263 associated with the closest location information 264*a* and having the address 264*b* to be assigned by the addressing application 500 to the proximate notification safety device 300. If the identified record 263 is not populated with an address 264*b*, the addressing application 500 may prompt the address generator 260 for an address 264*b* to populate in the identified record 263 and assign to the notification safety device 300. The address 264*b* may include the GPS coordinates of the current position of the mobile device 400 as a part of the address, or use the GPS coordinates to populate a unique identifier, which may be indicative of the location of the notification safety device 300. It is also appreciated that the GPS current position may also be used to verify or update location information within the control panel 200, thus providing additional functionality to ensure that the notification safety device 300 is in its proper location.

With continued reference to the figures, the address generator 260 may be a random number generator (e.g., an executable program) configured to generate random numbers to serve as the address 264*b* or unique identifier for the notification devices 300. The address generator 260 may further use additional identifying information related to a specific notification safety device 300 (e.g., model no., serial no., manufacturer no., GPS information etc.) for populating the address 264*b*. As previously discussed herein, the address generator 260 may not be required when the addressing application 500 has access to a configuration list 262 having predetermined addresses 264*b* for assigning to the notification devices 300. In one embodiment, the configuration list 262 may be submitted via the control panel 200 to the mobile device 400, or loaded into the mobile device 400 by an installer or programmer using any of the communication and/or interfaces for transmitting information to the mobile device 400 known to persons of ordinary skill.

In yet a further embodiment, the address generator 260 may include verification capabilities for verifying whether an address 264*b* has been previously assigned, (i.e., in use). In an instance where the address 264*b* has previously been assigned, the address generator 260 may initiate its random number generator functionality for providing a new/unused address for the notification safety device 300. In an embodiment where the address generator 260 has this dual functionality (i.e., using a list and/or generating unique identifiers), the generated number may subsequently be added to the dataset (list 262) as a new address 264*b* for the identified record 263 of the notification safety device 300 to be assigned the address 264*b*, and the configuration list 262 then transmitted to the control panel 200 along with additional configuration and location information pertaining to now addressed notification safety device 300.

Figure 5:
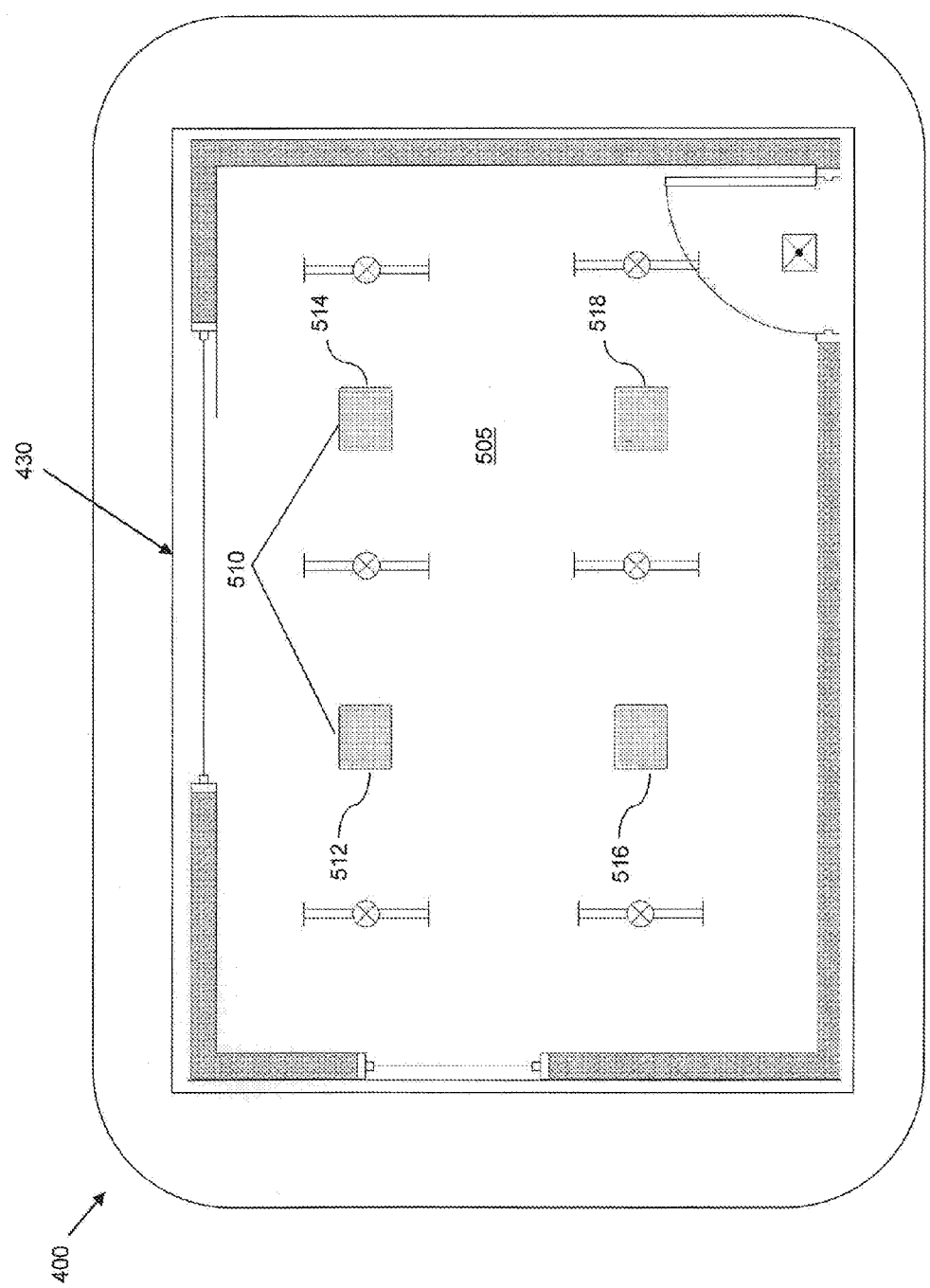
FIG. 5 illustrates a addressing application having an exemplary installation layout for the notification safety devices shown in FIG. 4, which may be utilized by the mobile device shown in FIG. 5.

With continued reference to the figures, and now FIG. 5, an illustration is shown of a screen capture of a display of a floor plan FP generated by the addressing application 500 using the user interface 430. In this embodiment, the screen 505 as generated and displayed by the addressing application 500 includes an exemplary installation layout for the notification safety devices 300, which may be utilized by a technician or installer using the mobile device 400 in accordance with one aspect of the invention as described herein. The addressing application 500 may be stored on the memory 420 of the mobile device 400. The processor 410 may execute a series of instructions/commands from the addressing application 500 to facilitate the programming of the notification safety device 300. The addressing application 500 generates a graphical depiction on screen 505 representative of the installation floor plan FP of a floor of a building with a plurality of icons 510 disposed on the floor plan FP to reflect the location of a corresponding number of notification safety devices 300 as installed on the floor of the building or possible locations for installing notification safety devices 300 on the floor of the building. Upon user selection of a respective one of the icons 510, which may be graphical and/or textual (e.g., hyperlinks), the addressing application 500 may executes a series of commands/codes for facilitating the exchange of information between the notification safety device 300 within the system 100 corresponding to the selected icon 510 and the mobile device 400.

In the exemplary embodiment of FIG. 5, the addressing application 500 generates icons 510 graphically depicting a plurality of notification safety devices 300 in an office building environment divided into at least four sections. The notification safety devices 300 are represented in this exemplary embodiment by icons 512, 514, 516, and 518, and are installed in each section of the office building environment i.e., one notification safety device 300 in each section. During the installation process, an installer/programmer may trigger the addressing application 500 to begin programming the installed notification safety device 300 by selecting its corresponding icon 512, 514, 516, or 518 on the screen 505. Once an icon 510 is selected, e.g., icon 512, the mobile device 400 may command the notification safety device 300 corresponding to the selected icon 512 to enter into a programming state. In an embodiment where the notification safety device 300 is already in a programming state, the selection of icon 512 may simply confirm the status of notification safety device 300 to begin the programming process. Selection of icon 512 may then initiate the transmission of configuration information to the notification safety device 300. This configuration information may include, among other things, a request or command to update the status of the notification safety device 300, in addition to a record 263 having location information 264*a* for identifying the location of the notification safety device 300. At this time, and upon selecting the icons 510, the address generating means 490 may be initiated to facilitate populating an address 264b for transmitting to the notification safety device 300.

Following the transmission of the location information, the mobile device 400 may confirm receipt by transmitting a confirmation request to the notification safety device 300, or the notification safety device 300 may be configured to submit the confirmation automatically upon successful programming. Additionally, receipt of the confirmation information may be facilitated via the control panel 200 in addition to the other devices within the system 100. Following the successful transmission of the configuration information, the status of the notification safety device 300 may switch (automatically or by command) from a programming status to an active status. The updated status may be reflected in the mobile device 400, and/or the control panel 200. Should the programming of the notification safety device 300 not succeed, the notification safety device 300 may remain in the programming mode for subsequent attempts to program the notification safety device 300. The unsuccessful notification confirmation may also be transmitted to the control panel 200 and/or the mobile device 400, thereby notifying the programmer that there may be an issue with programming the notification safety device 300. The programmer may then elect to manually restart the programming process, or the process may be repeated in real-time by the addressing application 500 without user intervention and until a successful confirmation is obtained.

With reference to FIGS. 1-5, and now FIG. 6, a further embodiment of a system for addressably programming a notification safety device is provided. In this embodiment, a second mobile device 600 may be use for addressably programming the notification safety device 300. The second mobile device 600 may be identical (i.e. same configuration, construction, model, etc.) to the mobile device 400, or e.g., a similar device like a wand pointer or pen-like instrument having one or more sensors and circuitry (similar to the mobile device 400) for interfacing with the notification safety device 300 and the mobile device 400. The second mobile device 600 may further be configured to interface with the control panel 200 independent of the mobile device 400 for performing the functions of the mobile device 400, e.g., executing the addressing application 500, and/or address generating means 490. Thus allowing the second mobile device 600 to function autonomously in the system 100 for programming the notification safety device 300.

In the embodiment shown in FIG. 6, the second mobile device 600 includes a network interface component 650 and a mobile sensor 670. The network interface component 650 may be similar to the network interface components described herein for facilitating a direct or remote communications link with the devices within the system 100. The mobile sensor 670 may be similar to the mobile sensor of the mobile device 400 for providing dual functionality for communicating with the system 100 devices, or more particularly the notification safety device 300. The network interface component 650 may be removable and operably connected to the mobile device 400 using a cable 482 or the like. It should be appreciated that a wireless connection may also be established between the mobile devices via wireless protocols and/or transmitters discussed herein (e.g., Bluetooth, Infrared Sensor or the like). The cable 482 may be connected to the port 480 of the mobile device 400 for transmitting information for programming the notification safety device 300. The second mobile device 600 may also include a user interface for executing commands using the second mobile device 600. The user interface may be similar to the user interfaces discussed herein. Additionally, the user interface may be coupled to an input means for executing commands, e.g., one or more buttons selectively and operably attached to the circuitry of the second mobile device 600.

The second mobile device 600 may further include one or more audible or visual indicators (not shown) for confirming its operability and/or identifying to the programming that information is being transmitted to and from the notification safety device 300. In operation, the programmer may launch the addressing application 500 on the mobile device 400, or using the second mobile device 600 when present. The mobile device 400 may indicate to the programmer that the second mobile device 600 is detected and connected thereto. The programmer may then select the icon 510 corresponding to the notification safety device 300 for which the programmer is attempting to address, the selection of which executes a series of instructions as discussed herein. The programmer may then guide the second mobile device 600 into the direction of the notification safety device 300, thereby establishing a link to the notification safety device 300. Thereafter, configuration information may be transmitted to the notification safety device 300. During the transmission of information, the audible or visual indicators of the second mobile device 600 may be activated to confirm operability and that information is being transmitted to the notification safety device 300 and/or other devices within the system 100. Upon the successful transmission of information, e.g., addressing the notification safety device 300, a confirmation of the successful programming may then be communicated to the programmer via the second mobile device 600 or the mobile device 400. This successful confirmation may be represented by a specific audio sound, or by a change in the visual effects of the icon 510, or by any means known to persons of ordinary skill in the art to confirm the successful completion of a task.

Figure 7:
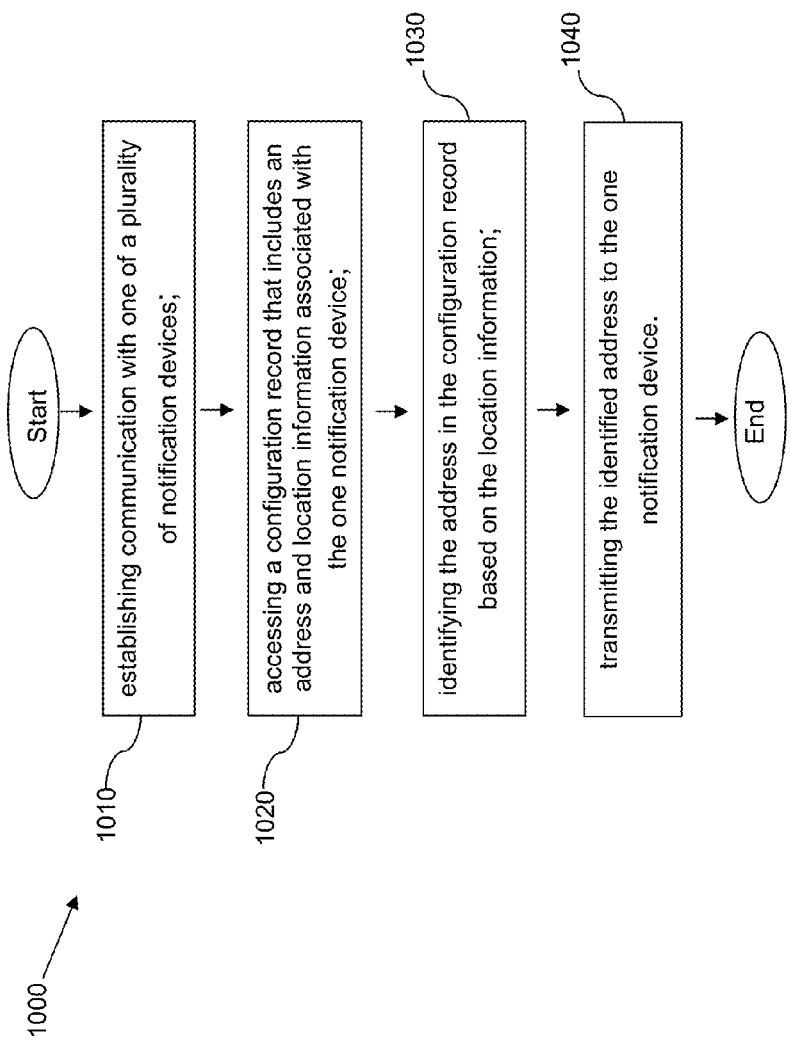
FIG. 7 illustrates a flowchart for an embodiment of a method for addressably programming a notification safety device in accordance with the disclosure provided herein.

With continued reference to the figures, and now FIG. 7, a flowchart for an embodiment of a method 1000 for addressably programming the notification safety device 300 in accordance with the disclosure herein is provided. The notification safety device 300 may be physical installed in a desired location, and based on a predetermined installation floor plan FP. The mobile device 400 may be proximate to the installed notification safety device 300 such that the network interface components or sensors of the devices are within range of each other to establish a communications like. For example, similar to the embodiment of FIG. 6, the mobile device 400 may be in the same room as the notification safety device 300 to be programmed, and the second mobile device 600 may be guided in the direction of the notification safety device 300 to facilitate the transfer of information between the devices.

In step 1010, the method 1000 includes the step of triggering an addressing application 500 for establishing, via a mobile device 400, communication with one of a plurality of notification safety devices 300. In one embodiment, as part of step 1010, an installer may select an icon 510 on the screen 505 of the floor plan FP generated and displayed by the addressing application 500 via the user interface 430 of the addressing application 500. Upon selection of the icon 510, the addressing application 500 is triggered to determine the notification safety device 300 corresponding to the selected icon 510 to establish communication. The communication between the mobile device 400 and the notification safety device 300 may be wired or wireless. Step 1010 may further include selectively pointing a transmitter of the mobile device 400 towards a sensor of the one notification safety device 300, and transmitting a pre-determined signal to the notification safety device 300 to signal the notification safety device 300 to receive an identified address. In step 1020, the addressing application 500 may access, via the mobile device 400, a configuration list 262 including one or more records 263 having an addresses 264b and location information 264a associated with the notification safety devices 300. In step 1030, identifying an address 264b in the configuration list 262 based on the location of the notification safety device 300 proximate to the mobile device 400. In step 1040, the addressing application 500 transmits the identified address 264b to the notification safety device 300.

In a further embodiment, a process for addressable programming a notification safety device 300 may be implemented by executable instructions stored in a non-transitory computer-readable medium that causes one or more processors to perform one or more operations for addressably programming the notification safety device 300. In this embodiment, for example, the operations begins with triggering an addressing application 500 for establishing, via the mobile device 400, wired or wireless communication with the notification safety devices 300. The operation further includes accessing, via the mobile device 400, the configuration list 262 that includes the location information associated with the notification safety device 300. Once the configuration list 262 is accessed, an address 264b in the configuration list 262 is identified and the transmitted to the notification safety device 300 via the mobile device 400.

In yet a further embodiment for addressably programming a notification safety device 300 during a walkthrough of an area with one or more installed notification safety devices 300, a programmer may begin addressing the notification safety devices 300 by activating the addressing application 500 via the mobile device 400. As previously described, the addressing application 500 is triggered on the mobile device 400 and subsequently generates a floor plan FP having various icons 510 representative of the installed notification safety devices 300. The programmer may then select the icon 510 representative of an installed notification safety device 300. Upon selection of the icon 510, a series of executable instructions of the addressing application 500 may be initiated for interfacing the mobile device 400 with the installed notification safety device 300 and transmitting an address 264b from the configuration list 262 to the notification safety device 300. It should also be appreciated that if the notification safety device 300 was not previously set to the programming mode, selecting icon 510 may change the status of the chosen notification safety device 300 to a programming status for receiving addressable/configuration information. Additionally, and in a further embodiment, selecting icon 510 may initiate the addressing application 500 to communicate with the address generator 260 to populate addressable information for transmitting the same to the notification safety device 300. The steps of interfacing with the notification safety device 300, initiating the address generator 260, and transmitting the addressable information to the notification safety device 300 may be accomplished in real-time, and upon a single or multiple selections of the icon 510. Additionally, confirmation that the transmission of the address 264b to the notification safety device 300 was successful or unsuccessful may be received by the programmer via the addressing application 500. For confirmations that are unsuccessful, as previously stated, the addressing application 500 may continue to transmit a series of commands to the notification safety device 300 until the notification safety device 300 programming is successful. In an instance where the programming is successful, the notification safety device 300 may then be set to an active state. The active state may be displayed to the user via the addressing application 500 and/or transmitted to the control panel 200 for subsequent monitoring of emergency conditions using the notification safety device 300.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality. Additionally, the steps of various methods disclosed herein are not required to be performed in the particular order recited, unless otherwise expressly stated.

I claim:

1. An apparatus for addressably programming a notification device, comprising:
    a wireless transceiver operably configured to selectively establish communication with the notification device;
    a configuration list that includes location information associated with the notification device and an address associated with a network connecting the notification device to a control panel;
    a memory that stores the configuration list and a plurality of instructions that, when executed, accesses the configuration list to identify the address based on the location information, and assigns the identified address to the notification device via the wireless transceiver to establish the notification device's operability with the control panel across the network; and
    a processor in signal communication with the memory and that executes the plurality of instructions.

2. The apparatus of claim 1, wherein the configuration list is received from the control panel via the wireless transceiver.

3. The apparatus of claim 1, wherein the plurality of instructions further includes placing the notification device into a state to receive the identified address.

4. The apparatus of claim 1 further comprising a port and a commissioning tool operably connected to the port, wherein the commissioning tool includes a sensor that has the wireless transceiver and selectively positioned to point to the notification device to permit transmission of the identified address to the notification device.

5. A method for programming one of a plurality of notification devices with an address for communicating with a control panel across a network, comprising the steps of:
    establishing, via a portable apparatus, wireless communication with the one of the plurality of notification devices;
    accessing, via the portable apparatus, a configuration list that includes the address and location information associated with the one notification device;
    identifying the address in the configuration list based on the location information; and
    transmitting the identified address to the one notification device to establish the one notification device's operability with the control panel across the network.

6. The method of claim 5, wherein the notification device has a sensor for detecting a pre-determined signal and the step of establishing comprises:
selectively pointing a transmitter of the portable apparatus towards the sensor of the one notification device; and
transmitting the pre-determined signal to the one notification device to signal the one notification device to receive the identified address.

7. The method of claim 6, further including the step of:
prior to transmitting the identified address, receiving a confirmation from the one notification device that the one notification device is ready to receive the identified address.

8. The method of claim 5, wherein the portable apparatus includes a user interface and the method further comprising the steps of:
displaying, via the user interface, a layout of an area of a building and a plurality of icons identifying the plurality of notification devices, each icon positioned on the layout to reflect a respective location of the notification device identified by the respective icon; and
receiving, via the user interface, a selection of one of the icons, wherein the selection identifies the location information associated with the one notification device.

9. The method of claim 5, wherein the portable apparatus is operably connected to a wand pointer that selectively transmits a pre-determined signal, and the transmitting operation comprises transmitting the pre-determined signal with the address to the one notification device via the wand pointer.

10. The method of claim 5, wherein the configuration list is populated by an address generator.

11. The method of claim 5, wherein the configuration list comprises a records of predetermined addresses and the identified address is one of the predetermined addresses.

12. The method of claim 11, wherein the record of predetermined addresses is provided by a control panel in operable communication with the portable apparatus.

13. A non-transitory computer-readable medium storing therein an addressable program that causes an apparatus for addressably programming a notification device to execute an operation, the operation comprising:
establishing, via a portable apparatus, wireless communication with one of a plurality of notification devices;
accessing, via the portable apparatus, a configuration list that includes the address and location information associated with the one notification device;
identifying the address in the configuration list based on the location information and
transmitting the identified address to the one notification device to establish the notification device's operability with a control panel on over a network.

14. The non-transitory computer-readable medium of claim 13, wherein the notification device has a sensor for detecting a pre-determined signal and the operation of establishing comprises:
selectively pointing a transmitter of the portable apparatus towards the sensor of the one notification device; and
transmitting the pre-determined signal to the one notification device to signal the one notification device to receive the identified address.

15. The non-transitory computer-readable medium of claim 14, wherein the operation further comprises:
prior to transmitting the identified address, receiving a confirmation from the one notification device that the one notification device is ready to receive the identified address.

16. The non-transitory computer-readable medium of claim 13, wherein the portable apparatus includes a user interface and the operation further comprises:
displaying, via the user interface, a layout of an area of a building and a plurality of icons identifying the plurality of notification devices, each icon positioned on the layout to reflect a respective location of the notification device identified by the respective icon; and
receiving, via the user interface, a selection of one of the icons, wherein the selection identifies the location information associated with the one notification device.

17. The non-transitory computer-readable medium of claim 13, wherein the portable apparatus is operably connected to a wand pointer that selectively transmits a pre-determined signal, and the transmitting operation comprises transmitting the pre-determined signal with the address to the one notification device via the wand pointer.

18. The non-transitory computer-readable medium of claim 13, wherein the configuration list is populated by an address generator.

19. The non-transitory computer-readable medium of claim 13, wherein the configuration list comprises a record of predetermined addresses and the identified address is one of the predetermined addresses.

20. The non-transitory computer-readable medium of claim 19, wherein the record of predetermined addresses is provided by the control panel in operable communication with the portable apparatus.

21. A networked safety system comprising:
a notification device operably connected to a mobile communication device proximate to the notification device via a communication link;
wherein the mobile communication device includes:
a wireless transceiver operably configured to selectively establish communication with the notification device;
a configuration list that includes location information associated with the notification device and an address associated with a network connecting the notification device to a control panel;
a memory that stores the configuration list and a plurality of instructions that, when executed, accesses the configuration list to identify the address based on the location information, and assigns the identified address to the notification device via the wireless transceiver to establish the notification device's operability with the control panel; and
a processor in signal communication with the memory and that executes the plurality of instructions.

22. The networked safety system of claim 21, wherein the configuration list is received from the control panel via the wireless transceiver.

23. The networked safety system of claim 22, wherein the plurality of instructions further includes placing the notification device into a state to receive the identified address.

24. The networked safety system of claim 21, wherein the mobile communication device further includes:
a port and a commissioning tool operably connected to the port, wherein the commissioning tool includes a sensor that has the wireless transceiver and selectively positioned to point to the notification device to permit transmission of the identified address to the notification device.

* * * * *